US010812657B1

(12) United States Patent
Czachor, Jr. et al.

(10) Patent No.: US 10,812,657 B1
(45) Date of Patent: Oct. 20, 2020

(54) SYSTEM AND METHOD FOR CADENCE MATCHING AT ANSWERING SERVICE OR THE LIKE

(71) Applicant: ASD Inc., a Pennsylvania Corporation, Media, PA (US)

(72) Inventors: Martin Czachor, Jr., Newtown Square, PA (US); Kevin Czachor, West Chester, PA (US); Norman Franke, Garnet Valley, PA (US)

(73) Assignee: ASD Inc., a Pennsylvania Corporation, Media, PA (US)

( * ) Notice: Subject to any disclaimer, the term of this patent is extended or adjusted under 35 U.S.C. 154(b) by 0 days.

(21) Appl. No.: 16/453,904

(22) Filed: Jun. 26, 2019

(51) Int. Cl.
*H04M 3/523* (2006.01)
*H04M 3/51* (2006.01)
*G10L 25/48* (2013.01)

(52) U.S. Cl.
CPC .......... *H04M 3/5232* (2013.01); *G10L 25/48* (2013.01); *H04M 3/5108* (2013.01); *H04M 3/5175* (2013.01); *H04M 3/5183* (2013.01); *H04M 2242/30* (2013.01)

(58) Field of Classification Search
None
See application file for complete search history.

(56) References Cited

U.S. PATENT DOCUMENTS

| | | |
|---|---|---|
| 8,467,515 B2 | 6/2013 | Czachor, Jr. et al. |
| 8,498,399 B2 | 7/2013 | Czachor, Jr. et al. |
| 8,548,149 B2 | 10/2013 | Czachor, Jr. et al. |
| 8,929,535 B1 | 1/2015 | Czachor, Jr. et al. |
| 9,094,514 B2 | 7/2015 | Czachor, Jr. et al. |
| 9,300,800 B2 | 3/2016 | Czachor, Jr. et al. |
| 9,584,663 B2 | 2/2017 | Czachor, Jr. et al. |
| 10,165,112 B2 | 12/2018 | Czachor, Jr. et al. |
| 10,165,120 B2 | 12/2018 | Czachor, Jr. et al. |
| 10,212,281 B2 | 2/2019 | Czachor, Jr. et al. |
| 10,334,105 B1 | 6/2019 | Czachor, Jr. et al. |
| 2002/0090076 A1* | 7/2002 | Uppaluru ............ H04M 3/5237 379/265.04 |
| 2007/0025540 A1* | 2/2007 | Travis ................. H04M 3/5232 379/219 |
| 2007/0121893 A1* | 5/2007 | Khouri .................... H04M 3/51 379/265.02 |
| 2012/0033799 A1* | 2/2012 | Czachor, Jr. ............ H04M 3/51 379/214.01 |
| 2015/0086002 A1* | 3/2015 | Jain ..................... H04M 3/5235 379/265.1 |
| 2015/0213800 A1* | 7/2015 | Krishnan ............ H04M 3/4936 704/246 |

\* cited by examiner

*Primary Examiner* — Antim G Shah
(74) *Attorney, Agent, or Firm* — Steven H. Meyer, Esq.

(57) ABSTRACT

A call from a caller to a called party is forwarded to an answering service. A cadence of the call is determined, and an agent is selected to answer the call. To select the agent, a cadence of the selected agent is determined, and the determined cadence of the selected agent is matched to the determined cadence of the call. In particular, the called party has a geographic location associated therewith, and the selected agent has a cadence that matches a cadence associated with the determined geographic location. Contact between the selected agent and the call is then effectuated. The matched cadence is expected to heighten a connection the caller perceives from the selected agent.

20 Claims, 4 Drawing Sheets

SYSTEM AND METHOD FOR CADENCE MATCHING AT ANSWERING SERVICE OR THE LIKE

FIELD

The present disclosure relates to a business organization or the like that provides answering services, such as answering services for professionals such as doctors, lawyers, funeral directors, servicing representatives, and the like. More particularly, the present disclosure relates to such a business organization that provides such answering services in an especially personal manner, where emphasis is made on ensuring that a caller feels comfortable with the business organization and an agent thereof in communication with the caller. In particular, the present disclosure relates to the business organization taking positive actions to ensure that the agent is matched to the caller before communication therebetween is initiated, whereby among other things a speaking style of the agent is at least attempted to be matched to a speaking style of the caller.

BACKGROUND

In many business- or professional-related situations or the like, an age-old and recurring problem is effectuating contact between a professional or the like and a caller or the like calling or otherwise attempting to contact the professional. Perhaps ideally, the caller would place a telephone call or the like to the professional, the professional would answer the placed telephone call instantaneously if not within a matter of moments, the desired contact would thus be established, and the caller and professional could communicate regarding some matter of interest. Notably, however, most professionals are not always available to answer all calls instantaneously or even momentarily. For example, the professional simply may not want to answer calls, such as for example if on a vacation or at a family event, among other things, or the professional may be otherwise occupied by professional matters.

With regard to the latter case in particular, it may be that a doctor may be occupied by a medical matter and unavailable, or a lawyer may be in a legal conference from which she or he is not to be disturbed. Likewise, a funeral director may be attending to a first caller while a second caller is calling. In such a particular situation as well as others, it should be noted that not only is the funeral director otherwise occupied by the first caller, but the nature of the funeral business is such that it would be considered to be particularly insensitive if not rude to answer the call from the second caller while still attending to the first caller.

Generally, it is to be recognized that a professional or the like may not always be immediately available to answer a call from a caller, be it to a landline telephone line or a mobile telephone line or to such other communications device which may be available. As should be appreciated, such a situation can exist even when the caller is calling regarding an urgent matter, such as a life-threatening matter or a matter that otherwise should be given immediate attention. Accordingly, it is known that such a professional may employ a business organization that provides answering services or the like (hereinafter, 'an answering service') to answer calls from callers when the professional is not immediately available.

As should be understood, a call to the professional is forwarded therefrom to the answering service by appropriate means when the professional is not available to answer such call or the like, and the answering service may perform a range of answering duties on behalf of the professional. For example, upon answering the call on behalf of the professional, the answering service may let the caller know when the professional is scheduled to be available, or may collect information so that the professional can return the call at an opportune time. Likewise, the answering service may perform an assessment regarding the nature of the call and based thereon may perform a range of actions. Thus, the answering service may determine that a relatively more serious matter requires more immediate action from the professional, in which case the answering service may attempt to contact the professional as soon as possible by appropriate means. Correspondingly, the answering service may determine that a relatively less serious matter requires less immediate action from the professional, in which case the answering service may only create a message for the professional to be collected thereby at a later time.

Particularly with regard to funeral directors and the special needs thereof, funeral answering services and the like have been developed to focus on and address same. Moreover, it should be understood that such funeral answering services are employed not only by funeral directors, but also by other funeral professionals that require similar heightened levels of dignity, caring, and compassion in their answering service needs. Such other funeral professionals may for example include funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like.

Typically, upon a funeral business engaging an answering service to answer calls to the funeral business, the answering service engages the services of one or more telephone service providers or the like to effectuate forwarding of telephone calls or the like from the business to the answering service, particularly in a manner deemed necessary and/or advisable by the business. Such engaging and such forwarding services are generally known and need not be set forth herein in any detail other than that which is provided. Generally, the forwarding may occur on any appropriate basis, including the time of day, whether forwarding has been positively engaged or disengaged, whether the business has selected a particular call for forwarding, whether a call has rung a predetermined number of times, whether a phone or phone system of the business is off, or the like.

Notably, the answering service may answer a call on behalf of a particular funeral business according to a predetermined procedure or 'script' that has been established for the particular funeral business. As may be appreciated, the script can be quite involved, and can tend to cover a wide range of subjects, including the name and location of the deceased, the name, location, and telephone number of the caller, whether the caller is a family member or friend or a staff member at a nursing home or hospital or the like, where and when the funeral is to be performed, where and when burial or cremation is to be performed, required clergy, directions to establishments, parking availability and needs, handicap accessibility, available local florists and flower delivery services, and the like. In fact, such scripts can accommodate a wide range of scenarios and needs, and therefore can be quite extensive. Importantly, with the use of such a script, information can be collected from the funeral caller according to the script and entered into an appropriate database or the like for later retrieval and use, as is generally known.

It is to be understood that in at least some professional situations, an answering service acts not only to answer calls on behalf of a professional, but also acts as what likely is the first contact a caller encounters regarding a called professional. Thus, the answering service and the agent thereat in communication with the caller may in fact be the initial contact point for the caller with respect to the professional, and in such an instance may be the source of the first impressions the caller forms with regard to the answering service. Put simply, if the caller forms a bad impression based on communicating with the agent and/or the answering service, the caller may also form a bad impression of the called professional, and perhaps may choose to forego employing the called professional in favor of another professional, among other things. In contradistinction, if the caller forms a good impression based on communicating with the agent and/or the answering service, the caller may also form a good impression of the called professional, and perhaps may choose to in fact employ the called professional, among other things.

Formation of such an impression of the agent and/or the answering service by a caller is highly subjective, and may be expected to occur based on many factors. Among other things, such factors are on the order of whether the agent was polite, whether the agent spoke clearly, whether the caller was addressed expeditiously, whether the agent was helpful, whether the caller felt satisfied, etc. As may be appreciated, some of such factors may be based solely on a whim or perceived requirement of the caller and may even lack logic or rationality, and therefore may be beyond the control of the answering service. That said, other of such factors are at least partially within the control of the answering service, and accordingly the answering service may be expected to address such controllable factors as known or as they are brought to the attention of the answering service.

One such factor that has been brought to attention is whether the caller perceives a kinship, bond, and/or emotional connection with the agent at the answering service in communication with such caller. That is, the likelihood that the caller forms a good impression of the agent and/or the answering service is increased if the caller perceives that the agent is somehow a kind of person that the caller considers similar to the caller, or at least someone with a shared commonality to the caller. As may be appreciated, then, the answering service may be expected to heighten the kinship, bond, and/or emotional connection the caller perceives from the agent by matching the agent to the caller before communication therebetween is initiated.

As may also be appreciated, matching the agent to the caller can take many forms, and in general may be performed to ensure that the agent is similar enough to the caller such that the caller may be expected to be more comfortable communicating with the agent. Of course, such matching should not be performed in a manner that may be considered discriminatory or unnecessarily biased, and should not be performed such that a level of service to be provided by an agent to a caller is predetermined in a discriminatory or unnecessarily biased manner, among other things. That said, such matching should be performed in a manner that maximizes the good impression the caller hopefully can be expected to perceive from the answering service, the agent, and the call.

Empirically, it has been determined that one form of matching that can be expected to result in the aforementioned good impression is based on the cadence of the caller and the cadence of the agent. That is, it has been found that the likelihood that the caller forms the good impression is increased if among other things the speaking style of the agent more closely matches the speaking style of the caller. Accordingly, the modulation, inflection, speed, and overall rhythm of the agent can be expected to be more soothing and appreciated by the caller if more similar thereto.

Accordingly, a need exists for a system and method for selecting an agent at an answering service to communicate with a caller where the selected agent has a speaking style that more closely matches the speaking style of the caller. In particular, a need exists for such a system and method where selecting the agent is performed at least in part based on how the agent speaks as compared to how the caller may be expected to speak. Further, a need exists for such a system and method where such selecting occurs prior to the caller in fact speaking to the agent.

SUMMARY

A caller places a call to a called party and the called party is unable or unwilling to answer the call directly. The call is forwarded to an answering service and answered by an agent thereof. A computing system of the answering service determines a cadence of the call, and selects from one of a plurality of agents to answer the call from the caller. The selecting of the selected agent includes determining a cadence of the selected agent, and matching the determined cadence of the selected agent to the determined cadence of the call. Contact between the selected agent and the call is then effectuated. Notably, the matched cadence may be expected to heighten a kinship, bond, and/or emotional connection the caller perceives from the selected agent.

The call is received on a connection of the computing system of the answering service, and the received call is identified as being for a particular called party. A geographic location associated with the particular called party is determined, and one of the plurality of agents is selected as having a cadence that matches a cadence associated with the determined geographic location. The call is then assigned to the selected agent, and contact between the selected agent and the caller is effectuated.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
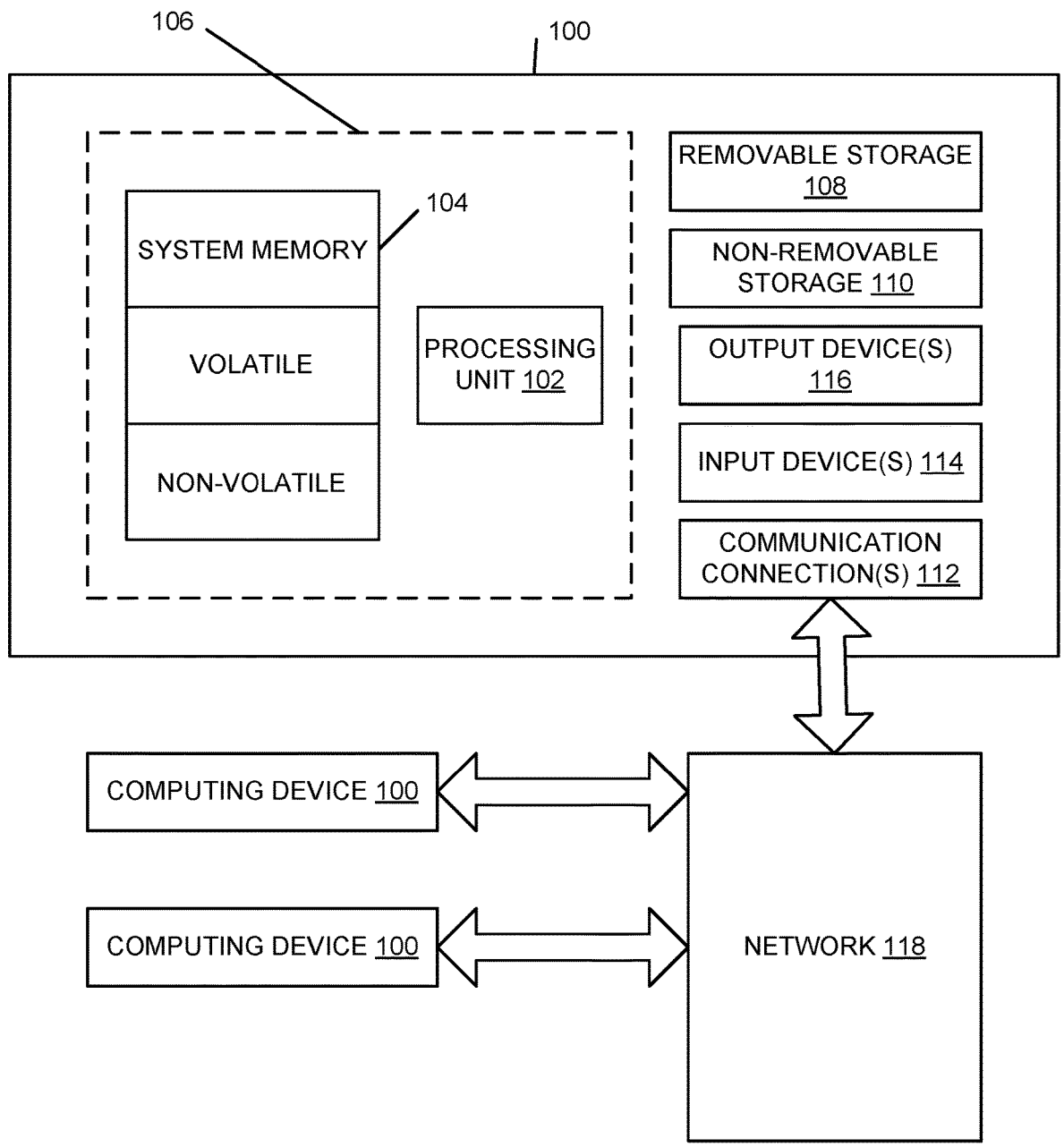
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, 'smart' phones, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), Wi-Fi, infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such a magnetic disk, an optical disk, a flash RAM drive, a locally accessible storage medium, a remotely accessible storage medium, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effectuated across a plurality of devices in a network 118. Such devices might include personal computers, network servers, and handheld devices, for example.

Professional Answering Service

Figure 2:
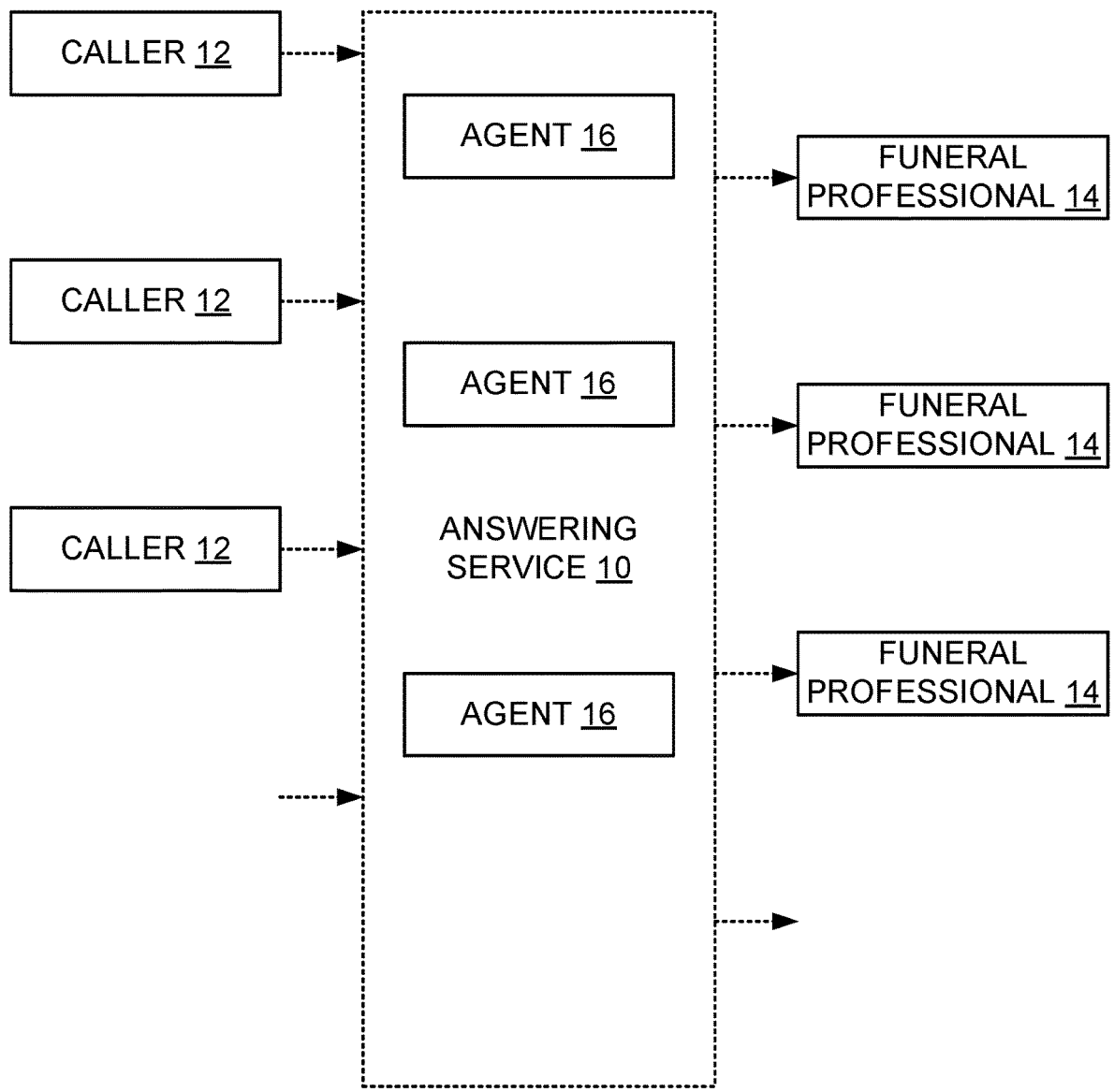
FIG. 2 is a block diagram showing a professional answering service provided to answer calls or the like from callers to professionals or the like in the event that the professionals are not willing or able to answer the calls.

Turning now to FIG. 2, it is seen that a professional answering service 10 is provided to answer each of one or more calls or the like from each of one or more callers 12 or the like to each of one or more professionals 14 or the like in the event that a particular professional 14 is not willing or able to answer a particular call from a particular caller 12. Typically, although not necessarily, the answering service 10 is operated by a business organization that provides answering services or the like on behalf of multiple professionals 14. As was alluded to above, each caller 12 and each professional 14 may be any appropriate respective caller and professional without departing from the spirit and scope of the present innovation. Thus, it may be that a particular professional 14 is a doctor, a lawyer, a service professional, a funeral director, or the like, among other things, and a particular caller 12 calling to the professional 14 may require the professional services thereof, perhaps on an urgent basis.

Likewise, the reason why the professional 14 does not answer a particular call may be most any reason without departing from the spirit and scope of the present innovation. For example, the professional 14 simply may not want to answer calls, such as for example if on a vacation or at a family event, among other things, or the professional 14 may be otherwise occupied by professional matters.

Presumptively, the call to the professional 14 from the caller 12 is of a telephonic nature, at least for purposes of disclosing the present innovation in the present disclosure. Thus, it may be that the caller 12 is employing a landline telephone or a mobile telephone (a device 100 of FIG. 1, e.g.), and is calling to a landline telephone or mobile telephone of the professional 14 (also a device 100 of FIG. 1, e.g.). Notably, though, the call to the professional 14 from the caller 12 could be of some other nature without departing from the spirit and scope of the present innovation. For example, it may be that the caller 12 is employing a digital electronic mail device or a digital texting device (again, a device 100 of FIG. 1, e.g.), and is addressing a digital electronic mail device or a digital texting device (once again, a device 100 of FIG. 1, e.g.) of the professional 14.

Particularly in the case where the call is telephonic in nature, and as seen in FIG. 2, the call from the caller 12 to the professional 14 is forwarded therefrom to the answering service 10 by appropriate means that have already been established in a generally known manner. Typically, and as was alluded to above, upon the professional 14 engaging the answering service 10 to answer calls on behalf of such professional 14, the answering service 10 communicates with one or more telephone service providers or the like to effectuate such forwarding. As should be understood, the forwarding may be performed according to any appropriate basis, including the time of day, whether forwarding has been positively engaged or disengaged, whether the business has selected a particular call for forwarding, whether a call has rung a predetermined number of times, whether a phone or phone system of the business is off, or the like. In any case, the call from the caller 12 to the professional 14 is in fact answered by the answering service 10 on behalf of the professional 14.

Funeral Professional

Although the professional 14 of the present innovation may be most any professional, it is to be appreciated that the present innovation has special relevance to funeral professionals 14, including not only funeral directors but also related professionals and services such as funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like. Notably, such funeral professionals 14 share a common need for a heightened level of dignity, caring, and compassion in connection with the services provided thereby to a caller 12, as well as the services provided on their behalf to the caller 12 by the answering service 10.

For example, a funeral director attending to a first caller 12 is expected to devote an especially heightened level of care and compassion to such first caller 12, even when a second caller 12 is calling such funeral director. Nevertheless, the second caller 12 also should expect the same heightened level of care and compassion. Thus, the dilemma is whether to interrupt the first caller 12 to answer the second caller 12, or to ignore the second caller 12, either of which may be considered to be particularly insensitive if not rude. Moreover, the dilemma may be compounded in the case where the second caller 12 is an initial caller initially calling regarding obtaining funeral services for a deceased, and ignoring same would result in the second caller 12 obtaining funeral services elsewhere, thus representing a substantial monetary loss to the funeral professional 14.

In such an instance, the answering service 10 in answering the call from the initially calling second caller 12 on behalf of the funeral professional 14 allows same to at least somewhat satisfy the needs of the second caller 12 for the moment. More generally, the answering service 10 can very likely be the first contact any caller 12 encounters regarding the called funeral professional 14, and in so doing is the initial public face of the funeral professional 14 to such caller 12 and acts to form the first impression by the caller 12 of the funeral professional 14. Thus, the funeral professional 14 should expect if not require that the answering service 10 treat each caller 12 with a heightened sense of dignity and decorum.

Answering Service Agents

As might be appreciated, providing the aforementioned dignity and decorum is especially difficult for the answering service 10 if the caller 12 has just suffered a loss of a relative or friend and is therefore in an especially precarious frame of mind. Accordingly, the answering service 10 may be expected to employ especially well-trained agents 16 to answer calls from callers 12 to funeral professionals 14, where the agents 16 are selected based at least in part on being compassionate, caring, soothing, and attentive, among other things.

It is to be understood that in at least some professional situations, the answering service 10 acts not only to answer calls on behalf of the professionals 14, but also acts as what likely is the first contact a caller 12 encounters regarding a called professional 14. Thus, an agent 16 at the answering service 10 may in fact be the initial contact point for the caller with respect to the called professional 14, and in accordance with the especially sensitive context that may be associated with the called professional 14, and as was alluded to above, the impression provided by the agent 16 to the caller 12 is important in determining whether the caller 12 favorably perceives the professional 14 and employs the goods and/or services provided thereby. Thus, it is vital that, in order for the caller 12 to form a good impression of the professional 14, such caller 12 should as a preliminary matter form a good impression of the agent 16 and also the answering service 10.

Admittedly, how the caller 12 forms such an impression of the agent 16, professional 14, and answering service 10 is a highly subjective process, which is not necessarily based solely on logic, reason, and rationality. As may be appreciated, it is helpful if the agent 16 is polite and provides good service to the caller 12, but that said it is to be understood that the impression formed by the caller 12 can also be based partly or even wholly on whim and other factors wholly beyond the control of the agent, such as whether the caller 12 is just in a bad mood or is having a bad day. That said, the agent 16 and the answering service 10 are in control of at least some of the factors that can contribute to the impression formed by the caller 12, and accordingly the agent 16 and/or the answering service 10 should attempt to address such controllable factors.

As was also alluded to above, one such factor is whether the caller 12 perceives a kinship, bond, and/or emotional connection with the agent 16 at the answering service 10 in communication with such caller 12. That is, it has been found that the likelihood that the caller 12 forms a good impression of the agent 16 and the answering service 10 increases if the caller 12 is made to feel or perceive that the agent 16 is somehow a kind of person that the caller 12 considers similar to the caller 12, so that the caller 12 feels a shared commonality with the agent 16. While primarily an issue of psychology, it should be generally understood that if the agent 16 can impart such a shared commonality to the caller 12, the agent 16 and the answering service 10 may be expected to heighten the kinship, bond, and/or emotional connection the caller 12 perceives from the agent 16. In various embodiments of the present innovation, and as will be set forth in more detail below, the answering service 10 may attempt to impart such shared commonality by matching the agent 16 to the caller 12 before communication therebetween takes place.

Cadence Matching at Answering Service

As alluded to above, matching the agent 16 to the caller 12 is performed by the answering service 10 in various embodiments of the present innovation in order to impart a shared commonality and to increase the likelihood that the caller 12 receives a good impression from the agent 16, professional 14, and answering service 10. As may be appreciated, such matching can take many forms, but in general is performed in an effort to increase the likelihood that the agent 16 is 'similar enough' to the caller 12 such that the caller 12 is more comfortable communicating with the agent 16. As may also be appreciated, care should be taken in performing such matching in order to avoid actions that could be perceived as discriminatory or unnecessarily biased, and also to avoid providing a level of service to the caller 12 in a discriminatory or unnecessarily biased manner, among other things. Overall, the goal of such matching should be to maximize the good impression the caller 12 hopefully can be expected to perceive from the agent 16, the professional 14, and the answering service 10.

Empirically, it has been determined that one form of matching that can be expected to result in the aforementioned good impression is based on the cadence of the caller 12 and the cadence of the agent 16. As used herein, and in various embodiments of the present innovation, the term 'cadence' in general refers to the speaking style of a voice, and more particularly is to be interpreted to mean any or all of: the speed of a speaking voice; the accent of the speaking voice; the rhythm of the speaking voice; the aural volume of the speaking voice; the general pitch or register of the speaking voice; whether the speaking voice includes a drawl, a twang, a boom, or other inflection; whether the speaking voice tends to merge or separate words; whether the speaking voice tends to merge or separate sentences; and the like. In general, such term 'cadence' may be interpreted in any appropriate manner without departing from the spirit and scope of the present innovation. As such, it is to be understood that a caller 12 is more likely to form the hoped-for good impression if among other things the cadence of the agent 16 more closely matches the cadence of the caller 12. Put simply, by matching cadences, the voice of the agent 16 is more similar to that of the caller 12 and as a result can be expected to be more soothing and appreciated by such caller 12.

Figure 3:
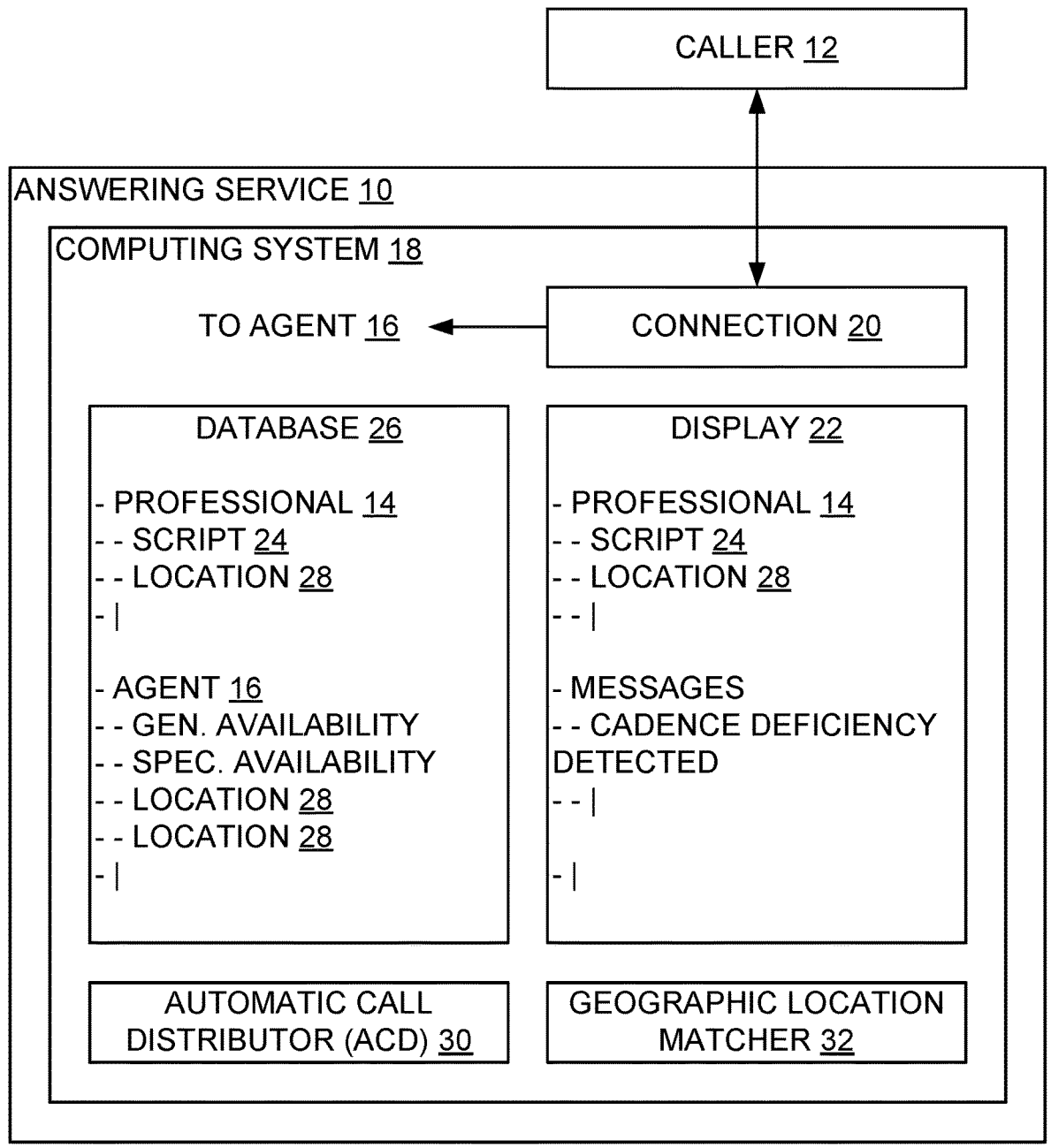
FIG. 3 is a block diagram of a computing system employed to answer a call from a caller of FIG. 2 to a funeral professional of FIG. 2 as forwarded to the answering service of FIG. 2 in accordance with various embodiments of the present innovation.

In various embodiments of the present innovation, and turning now to FIG. 3, it is presumed that a call from a caller 12 to a funeral professional 14 as forwarded to an answering service 10 is to be answered by one of several individual agents 16 associated with the answering service 10 with the use of a computing system 18 instantiated by or on behalf of the answering service 10. Notably, such a computing system 18 as instantiated includes a sub-system or the like for at least attempting to determine a cadence of the caller 12, and for selecting from one of the individual agents 16 to in fact answer the call from the caller 12, where the selection of the agent 16 is based at least in part on a cadence of the selected agent 16 and whether the cadence of the selected agent 16 can be said to match the cadence of the caller 12.

As seen in FIG. 3, the computing system 18 is in the nature of at least one of the computing device 100 on the top part of FIG. 1, and perhaps several of such computing devices 100 appropriately networked or otherwise interconnected. Here, it is to be appreciated that the computing system 18 may among other things include a connection 20 or the like for receiving the forwarded call from the caller 12, be it a voice call, a data call, a data message, a data conversation, or otherwise; a display 22 or the like upon which is shown various items; and other computing peripherals which should be apparent to the relevant public and/or which will be set forth in more detail below. As may be appreciated, the connection 20 in particular may be in the nature of voice and/or data and/or video connections as may be appropriate. Thus, in the present innovation, a call may encompass most any form of communication capable between two parties, be it voice- and/or data- and/or video-based or otherwise, including but not limited to electronic mail, a chat conversation, push messaging, text messaging, video chatting, etc.

As may be appreciated, the agent 16 as appropriately interfaced to the computing system 18 of the answering service 10 may answer a particular forwarded call from a caller 12 on behalf of a particular funeral professional 14 according to a predetermined procedure or 'script' 24 that has been established for the particular funeral professional 14 and stored in an appropriately configured local or remote database 26 (FIG. 3). As may be appreciated, such database 26 may be any appropriately configured database without departing from the spirit and scope of the present innovation. Such a database 26 is generally known or should be apparent to the relevant public and therefore need not be set forth herein in any detail beyond that which is provided.

Figure 4:
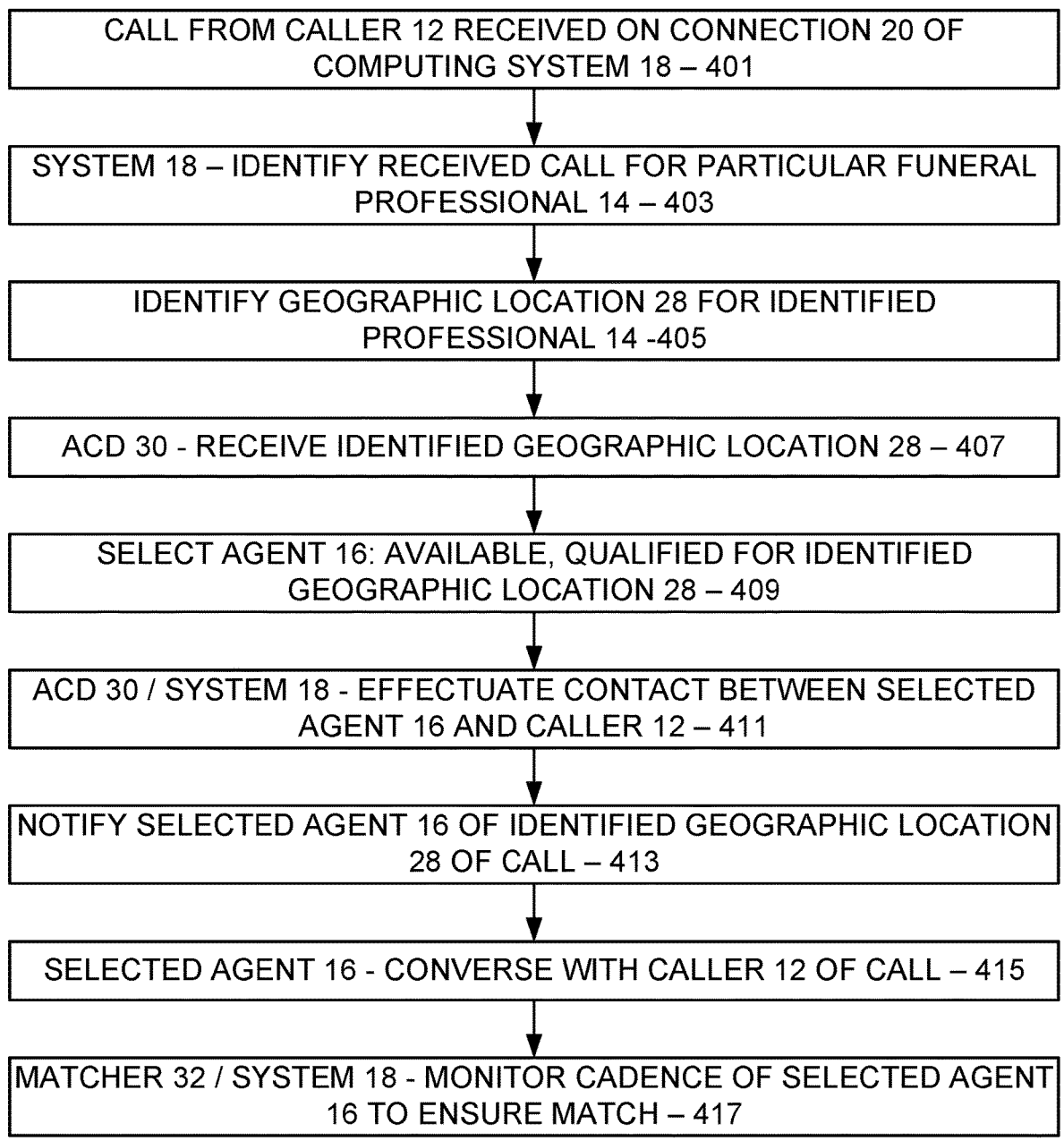
FIG. 4 is a flow diagram showing actions performed by the computing system of FIG. 3 in accordance with various embodiments of the present innovation.

Referring now also to FIG. 4, as an initial matter the particular call is received on the connection 20 of the computing system 18 (401, FIG. 4), and the received call is identified by the system 18 as being for a particular funeral professional 14 (403). As may be appreciated, the system 18 may identify the particular funeral professional 14 for the forwarded call as at 403 in any appropriate manner, such as for example based on a caller ID, DNIS (Dialed Number Identification System), or other information associated with the forwarded call. Likewise, the system 18 may identify the caller 12 if necessary and/or desirable, again in any appropriate manner, such as for example based on a caller ID, DNIS (Dialed Number Identification System), or other information associated with the forwarded call. Such identifying of the professional 14 and/or caller 12 is known or should be apparent to the relevant public and therefore need not be set forth herein in any detail other than that which is provided.

Now that the received call has been identified for a particular professional 14 as at 403, the system 18 then sets about identifying an agent 16 that has a cadence that matches a cadence of the caller 12. Notably, identifying a matching agent in terms of cadence may be performed in any appropriate manner without departing from the spirit and scope of the present innovation. As should be appreciated, in order to match cadences, it may be that a cadence of the voice of the caller 12 is identified by the system 18, perhaps by collecting a voice sample of the caller 12. Collecting such a voice sample and determining a cadence therefrom is generally known or should be apparent from the present disclosure and therefore need not be set forth herein in any detail beyond that which is provided. Accordingly, any appropriate form of such voice sampling and cadence determination may be performed without departing from the spirit and scope of the present innovation. For example, it may be that the caller 12 is preliminarily asked by an automated message of the system 18 to speak so as to provide such voice sample, and the system 18 thereafter in fact collects, stores, and analyzes the voice sample of the caller 12 in an appropriate manner.

As was alluded to above, the specific analysis of the voice sample depends upon the definition and type of cadence that the system 18 wishes to employ when matching an agent 16 of the answering service 10 to the caller 12. Thus, if the type of cadence is voice speed, it may be that the system 18 employs appropriate functionality to convert the voice sample to a stream of words, determines how many words were spoken, determines an amount of time employed by the caller 12 to speak the stream of words, and divides one by the other to arrive at a word speed, perhaps expressed in words per minute or per second. Similarly, if the type of cadence is based on speech volume, it may be that the system 18 employs functionality to ascertain from the voice sample an average power level, perhaps expressed in decibels, or loudness, perhaps expressed in sones. As another example, if the type of cadence is based on inflection such as drawl, twang, boom, and the like, it may be that the system 18 employs more sophisticated functionality to detect and identify such inflection within the voice sample.

One significant issue with regard to the aforementioned cadence identification by way of a collected voice sample from the caller 12 is that, quite simply, the caller 12 likely will not abide. Put another way, a caller 12 calling to speak to a professional 14 wishes to in fact speak with the professional 14 or at least an agent 16 with respect thereto as soon as possible, and does not wish to be bothered with seemingly frivolous or irrelevant time-consuming preliminaries such as providing a voice sample. After all, no one likes to be made to feel put off, even if for a useful purpose. Accordingly, in various embodiments of the present innovation, a cadence of the caller 12 is identified by the system 18 without obtaining any sort of voice sample from the caller 12. In particular, in such embodiments, a cadence is identified for the caller 12 based on indicia of the caller 12 and the call thereof and facts that may be determined or at least inferred therefrom.

Specifically, in at least some embodiments of the present innovation, a cadence for the caller 12 is surmised from at least one of a geographic location of where the caller 12 is calling from and a geographic location of the professional 14 called by the caller 12. With regard to the former, it is to be understood that employing the location of the caller 12 for purposes of identifying a cadence emphasizes an effort to ensure that the caller 12 speaks with an agent 16 that sounds like such caller 12. With regard to the latter, it is to be understood that employing the location of the professional 14 for purposes of identifying a cadence emphasizes an effort to ensure that the caller 12 speaks with an agent 16 that sounds like such professional 14. Also with regard to the latter, it is to be appreciated that the location of the professional 14 may for example be a present geographic location of the professional 14, perhaps presuming that the professional 14 is moving about while carrying a mobile communications device, or may for example be a predetermined base geographic location of the professional 14, perhaps presuming that the professional 14 has a designated fixed office location or the like.

As may be appreciated, geographic location may be used as an indicia of cadence for the caller 12, in the manner of the present innovation, insofar as the geographic location can be regionally associated with a voice pattern and the like typical thereto. Thus, if the geographic location of a caller 12 is in one of the Southern states of the United States of America, it typically can be expected that the caller 12 speaks with a so-called Southern accent, with its generally known slower speech patterns, pronounced drawl, and tendency to merge spoken words, among other things. Likewise, if the geographic location of a professional 14 is in one of the New England states of the United States of America, it typically can be expected that the professional 14 speaks with a so-called Yankee accent, with its generally known faster speech patterns, clipped pronunciation, and tendency to distinctly speak each spoken word, among other things.

Notably, in various embodiments of the present innovation, in addition to identifying a geographic location as a grouping of several states, a geographic location can also be identified with larger or smaller granularity, or as a defined portion of another geographic location. Thus, with regard to the aforementioned Southern states of the United States of America, it may for example be the case that the portion of southern Florida with a significant population of transplants from the greater New York City area may be excluded from the rest of Florida and/or the Southern states, and instead considered as its own geographic location, or may even be included with a geographic location that encompasses such greater New York City area, all without departing from the spirit and scope of the present innovation. More generally, in the present innovation, any predefined arrangement of geographic locations and corresponding cadences may be employed, as may be deemed necessary and/or advisable.

Returning now to FIG. 4, it is seen that once the system 18 identifies the particular funeral professional 14 for the forwarded call as at 403, and in various embodiments of the present innovation, the system 18 then identifies a predetermined geographic location 28 for the identified professional 14 (405). As may be appreciated, such geographic location 28 may be identified for the professional 14 in any appropriate manner without departing from the spirit and scope of the present innovation. For example, such location 28 may be set forth for the professional 14 in a database such as the database 26 in an appropriate record thereof, as is seen in FIG. 3, or such location may be derived from other available indicia. Such associating a location 28 for a professional 14 is generally known or should be apparent to the relevant public and therefore need not be set forth herein in any detail other than that which is provided.

Based on the identified geographic location 28 of the professional 14, the system 18 may then assign the forwarded call to an appropriate one of the agents 16 of the answering service 12. In particular, in various embodiments of the present innovation, the system 18 of the answering service 10 may employ an automatic call distributor (ACD) 30 or the like to in fact distribute all forwarded calls out among the available agents 16 of the answering service 10. Such an ACD 30 is generally known or should be apparent to the relevant public and therefore need not be set forth herein in any detail other than that which is provided. As may be appreciated, such an ACD 30 operates generally based on several inputs related to each particular call to select an agent 16 of the answering service 10 to in fact handle the particular call. Such inputs and such selection may be performed in any appropriate manner without departing from the spirit and scope of the present innovation. Generally, the ACD 30 in the context of the present innovation may be expected for a particular call to receive the identified geographic location 28 of the identified professional 14 of the particular call (407), and based on the identified geographic location 28 may be expected to select an agent 16 that is available and that has been certified or otherwise approved to handle calls for professionals 14 from the identified geographic location 28 (409).

Note here that an availability of each agent 16 at the answering service 10 may be provided to the ACD 30 and the system 18 in general in any appropriate manner without departing from the spirit and scope of the present innovation. For example, if each agent 16 works at an appropriately configured terminal of the system 18, it may be that as the agent 16 logs in and out or signs on and off to the system 18 at the terminal, the general availability of the agent 16 is appropriately noted to the ACD 30, or at least to a database accessible thereto, such as the database 26. Also, it may be that as the agent 16 starts and ends calls from other callers 12, the specific availability of the agent 16 is appropriately noted to the ACD 30, or at least to a database accessible thereto, such as the database 26. Maintaining agent availability is generally known or should be apparent to the relevant public and therefore need not be set forth herein in any detail other than that which is provided.

Note too that each agent 16 at the answering service 10 may be certified or otherwise approved to handle calls from a particular geographic location 28 in any appropriate manner without departing from the spirit and scope of the present innovation. For one example, it may be that one or more geographic locations 28 for which the agent 16 is suitable may be manually identified, perhaps by a supervisor of each agent 16, or by an appropriate cadence-identifying specialist, and that the suitable locations 28 for the agent 16 may be stored in an appropriate profile for the agent 16 in a database such as the database 26. For another example, as each agent 16 works at a terminal of the system 18, it may be that system 18 continuously monitors a word speed, vocal power, loudness, inflection type, or the like of the agent 16 by way of an appropriate geographic location matcher 32 (FIG. 3), and based thereon develops the aforementioned profile for the agent 16 in the database such as the database 26, including one or more geographic locations 28 for which the agent 16 is suitable. In such another example, the use of such a matcher 32 for monitoring the agent 16 allows for the possibility that the agent 16 can be automatically reassigned to different locations 28 over time as the cadence of the agent 16 changes, perhaps due to the passage of time in general, or due to day by day or even hour by hour changes. Thus, if the agent 16 is tired one afternoon and the cadence thereof decreases, or if the agent 16 has just returned from an evening coffee break and the cadence thereof increases, for example, the matcher 32 may notice same and automatically adjust. Compiling, developing, and otherwise updating and maintaining the locations 28 for which the agent 16 is suitable by way of a matcher 32 is generally known or should be apparent to the relevant public and therefore need not be set forth herein in any detail other than that which is provided.

As but one example, consider the case where a caller 12 calls a professional 14 which the system 18 identifies at 403 as being from Savannah, Ga. Here, it may be that Savannah and the rest of Georgia have been grouped into a geographic location 28 that generally includes the Southern states of the United States of America, where as was alluded to above it typically can be expected that the professional 14 speaks with a so-called Southern accent, with its generally known slower speech patterns, pronounced drawl, and tendency to merge spoken words, among other things. Thus, it may be that the identified geographic location 28 for the identified professional 14 as at 405 is the Southern states. Accordingly, the ACD 30 of the system 18 of the answering service 10 receives for the call from the caller 12 an input that the identified geographic location 28 of the identified professional 14 of the particular call is the Southern states, as at 407. Based thereon, the ACD 30 may then be expected to select an agent 16 that is available and that has been certified or otherwise approved to handle calls for professionals 14 from the Southern states, as at 409. Hopefully, then, the selected agent 16 also speaks with a so-called Southern accent, or at least with a cadence that has attributes thereof, such as for example slower speech patterns, or a pronounced drawl, among other things. Accordingly, and as was alluded to above, the caller 12 when speaking with the selected agent 16 at least hears someone who sounds somewhat like the professional 14, and as a result, the caller 12 hopefully senses a shared commonality with the agent 16 so as to heighten the kinship, bond, and/or emotional connection the caller 12 perceives from the agent 16.

As thus far set forth, the ACD 30 selects an agent 16 that is generally available (i.e., at a terminal of the answering service 10) and specifically available (i.e., not on another call) and that has been certified or otherwise approved to handle calls for professionals 14 from an identified geographic location 28, as at 409. That said, it can on occasion happen that no agent 16 is generally and specifically available for a call with regard to an identified geographic location 28 thereof. For example, it can happen that no agent with a Yankee accent is available to handle a call for a Yankee geographic location 28. In such a situation, and in various embodiments of the present innovation, it may be that the ACD 30 resorts to a default of selecting an agent that is generally and specifically available without regard for the locations 28 for which the selected agent 16 has been certified or approved. That is to say, rather than not selecting any agent 16 for such call, the ACD 30 at least selects an agent 16 even if the selected agent 16 is not cadence matched to the call. Thus, the call is at least answered, even if the caller 12 is for a Southern professional 14 but must be made to endure a Yankee agent 16.

At any rate, presuming that the ACD 30 indeed selects an available agent 16 that is qualified for professionals 14 from the identified geographic location 28, as at 409, the ACD 30 and the system 18 then effectuate contact between the selected agent 16 and the caller 12 at issue (411). Such effectuation by the ACD 30 and system 18 is generally known or should be apparent to the relevant public and therefore need not be set forth herein in any detail other than that which is provided. Accordingly, such effectuation may be performed in any appropriate manner without departing from the spirit and scope of the present innovation.

Note here that inasmuch as the selected agent 16 may be qualified for several geographic locations 28, it may be that the system 18 notifies the selected agent 16 of the identified geographic location 28 associated with the call (413), perhaps by way of an appropriate message in a display 22 of the terminal of the selected agent 16. Accordingly, the selected agent 16 may if possible attempt to modulate the cadence thereof in an effort to more closely match with a cadence associated with the identified geographic location 28. For example, the selected agent 16 may attempt to speak slower and include some drawl if the identified geographic location 28 is the Southern states, or to speak faster and with a clipped voice if the identified location 28 is the New England states.

Accordingly, the selected agent 16 in fact converses with the caller 12 of the call (415), perhaps according to the aforementioned script 24, and in doing so hopefully speaks with a matched cadence somewhat like the professional 14 to whom the caller 12 originally called. As a result, and again, the caller 12 hopefully senses a shared commonality with the selected agent 16 so as to heighten the kinship, bond, and/or emotional connection the caller 12 perceives from the selected agent 16. In various embodiments of the present innovation, during the course of the selected agent 16 conversing with the caller 12 as at 415, the system 18 may monitor the cadence of the selected agent 16 in an effort to ensure that such matched cadence is in fact achieved (417). Such monitoring may be performed in any appropriate manner without departing from the spirit and scope of the present innovation. For one example, it may be that the geographic matcher 32 (FIG. 3) performs such monitoring, and in doing so displays an appropriate message in the display 22 of the terminal of the selected agent 16 if a deficiency in the cadence of the agent 16 is detected. If so, the selected agent 16 may then if possible attempt to remedy the deficiency. Thus, the agent 16 can speak faster if monitored to be speaking slower than expected and vice versa, among other things. Matched cadence monitoring by way of a matcher 32 is generally known or should be apparent to the relevant public and therefore need not be set forth herein in any detail other than that which is provided.

Note here that while the selected agent 16 converses with the caller 12 of the call as at 415, it may alternately be the case that the selected agent 16 is expected to begin speaking with a matched cadence somewhat like the caller 12 and not especially like the professional 14 to whom the caller 12 originally called. As may be appreciated, in doing so, the caller 12 hopefully senses an enhanced shared commonality with the selected agent 16. In various embodiments of the present innovation, during the course of the selected agent 16 conversing with the caller 12 as at 415, the system 18 may monitor the cadence of the selected agent and also of the caller 12 in an effort to ensure that such matched cadence is in fact achieved, as at 417. As before, such monitoring may be performed in any appropriate manner without departing from the spirit and scope of the present innovation. Here, and again, it may be that the geographic matcher 32 (FIG. 3) performs such monitoring for both the caller 12 and the selected agent 16, and in doing so displays an appropriate message in the display 22 of the terminal of the selected agent 16 if a deficiency in the cadence of the agent 16 is detected. If so, the selected agent 16 may then if possible attempt to remedy the deficiency. Here, the agent 16 may for example speak faster if monitored to be speaking slower than the caller 12 and vice versa, among other things.

In the course of the selected agent 16 and the caller 12 conversing as at 415, and as before, the selected agent 16 perhaps based on the script 24 for the particular funeral professional 14 would collect information pertaining to the caller 12 and the reason for calling the funeral professional 14, and generally would act at some point to contact the funeral professional 14 with at least a portion of the collected information. As should be understood, such contacting may be performed in any appropriate manner without departing from the spirit and scope of the present innovation. For example, the collected information may be delivered in an appropriately form of data to the professional 14, perhaps as a data message or an electronic mail message, or the agent 16 may establish a voice connection with the professional 14 to deliver such collected information, among other things. Likewise, if warranted, the agent 16 may initiate contact with the professional 14 by way of an appropriate connection (not shown) while the call from the caller 12 is still in process, and may join the contacted professional into such call so that the caller 12 and professional 14 can communicate directly. Such joining is generally known, and may be performed in any appropriate manner without departing from the spirit and scope of the present innovation.

CONCLUSION

The programming believed necessary to effectuate the processes performed by the computing system 18 in connection with the various embodiments of the present innovation is relatively straight-forward and should be apparent to the relevant programming public based on the present disclosure. Accordingly, such programming is not attached hereto. Any particular programming, then, may be employed to effectuate the various embodiments of the present innovation without departing from the spirit and scope thereof.

In the present innovation, a system and method are set forth for selecting an agent 16 at an answering service 10 to communicate with a caller 12 where the selected agent 16 has a speaking style or cadence that more closely matches the speaking style of the caller 12 or a professional 14 to whom the caller 12 originally called. The system and method select the agent 16 at least in part based on how the agent 16 speaks as compared to how the caller 12 or professional 14 may be expected to speak. Such selecting may occur prior to the caller 12 in fact speaking to the agent 16.

It should be appreciated that changes could be made to the embodiments described above without departing from the innovative concepts thereof. For example, although the present innovation is set forth primarily in terms of a funeral business or the like, such innovation may also be practiced by any other appropriate type of business or called party that employs an answering service 10 for callers 12 or other parties. Likewise, although the present innovation is set forth primarily in terms of an answering service or the like, such innovation may also be practiced by any other appropriate type of business or service, whether acting in an intermediary capacity or otherwise. Moreover, although the present innovation is set forth primarily in terms of telephonic calls or the like from callers 12 and/or chats initiated by callers 12, such innovation may also be practiced in connection with any other appropriate type of communications medium and other types of interested parties, perhaps with suitable modification. Likewise, although the present innovation is set forth with reference to the use of particular elements, systems, and sub-systems, such particular manufactures need not necessarily be employed, or may be employed with suitable modification. Significantly, although the present innovation is disclosed primarily within the contextual reference of specific kinds of cadences and geographic locations, such terms should be interpreted broadly and without limitation to other forms of speaking styles and locations. Also significantly, although the present may at times refer to a cadence of a caller 12 or to a cadence of a professional 14, it should be understood that such terms may be considered to be interchangeable as appropriate unless the context clearly requires otherwise. It should be understood, therefore, that this innovation is not limited to the particular embodiments disclosed, but it is intended to cover modifications within the spirit and scope of the present innovation as defined by the appended claims.

The invention claimed is:

1. A method performed by an answering service when a caller places a call to a called party and the called party is unable or unwilling to answer the call directly, the call being forwarded to the answering service and answered by one of a plurality of agents of the answering service, the method being performed by a computing system of the answering service and comprising:
   determining a cadence of the call;
   selecting from one of the plurality of agents to answer the call from the caller, the selecting of the selected agent including:
   determining a cadence of the selected agent;
   matching the determined cadence of the selected agent to the determined cadence of the call; and
   effectuating contact between the selected agent and the call,
   the method comprising:
   receiving the call on a connection of the computing system of the answering service;
   identifying the received call as being for a particular called party;
   determining a geographic location associated with the particular called party, the determined geographic location having a predetermined cadence associated therewith, the predetermined cadence associated with the determined geographic location being a speaking style of a voice typically associated with the determined geographic location, based on at least one of voice speed, speech volume, and voice inflection;
   selecting one of the plurality of agents as having a cadence that matches the predetermined cadence associated with the determined geographic location, the cadence of the selected agent being a speaking style of a voice of the selected agent, based on at least one of voice speed, speech volume, and voice inflection;
   assigning the call to the selected agent; and
   effectuating contact between the selected agent and the caller,
   the called party being a funeral professional and the caller calling the funeral professional regarding goods and/or services available therefrom,
   whereby the matched cadence may be expected to heighten a kinship, bond, and/or emotional connection the caller perceives from the selected agent.

2. The method of claim 1 comprising:
   receiving the call on a connection of the computing system of the answering service;

identifying the received call as being from a particular geographic location;

selecting one of the plurality of agents as having a cadence that matches a cadence associated with the particular geographic location; and effectuating contact between the selected agent and the caller.

3. The method of claim 2 further comprising allowing the selected agent to converse with the caller, the selected agent hopefully speaking with a matched cadence somewhat like the caller, and monitoring the cadence of the selected agent and the caller in an effort to ensure that the matched cadence is achieved.

4. The method of claim 2 further comprising allowing the selected agent to converse with the caller, the selected agent hopefully speaking with a matched cadence somewhat like the caller, monitoring the cadence of the selected agent and the caller in an effort to ensure that the matched cadence is achieved, detecting that the matched cadence is not achieved, and displaying a corresponding message in a display associated with the selected agent so that the selected agent may if possible attempt to remedy same.

5. The method of claim 1 comprising determining the geographic location associated with the particular called party as a predetermined fixed location thereof.

6. The method of claim 1 further comprising determining the geographic location associated with the particular called party by pre-selecting from among a plurality of predetermined geographic locations, each predetermined geographic location having a predetermined cadence associated therewith.

7. The method of claim 1 wherein selecting the agent and assigning the call to the selected agent comprises employing an automatic call distributor (ACD) which distributes calls out among the agents of the answering service, the ACD receiving the determined geographic location of the called party of the call, and based on the determined geographic location selecting the selected agent as being available and as being approved to handle each call having the determined geographic location.

8. The method of claim 7 wherein the ACD determines that the selected agent is available when the selected agent is active at the answering service and is not otherwise occupied by another call from another caller.

9. The method of claim 1 wherein selecting one of the plurality of agents as having a cadence that matches a cadence associated with the determined geographic location comprises:

pre-identifying that the cadence of the selected agent is suitable for the predetermined cadence associated with the determined geographic location;

pre-storing the pre-identified geographic location in a record for the selected agent in a database; and retrieving from the database the record for the selected agent in a search for agents with a cadence suitable for the determined geographic location.

10. The method of claim 9 wherein pre-identifying that the cadence of the selected agent is suitable for the predetermined cadence associated with the determined geographic location comprises employing a matcher, the matcher continuously monitoring cadence characteristics of the selected agent and based thereon developing a profile for the selected agent in the database, including one or more geographic locations for which the selected agent is suitable.

11. The method of claim 10 further comprising the matcher automatically reassigning the selected agent to different geographic locations over time as the cadence of the selected agent changes.

12. The method of claim 1 further comprising notifying the selected agent of the determined geographic location associated with the particular called party by way of a message in a display associated with the selected agent.

13. The method of claim 1 further comprising notifying the selected agent of the determined geographic location associated with the particular called party by way of a message in a display associated with the selected agent, allowing the selected agent to converse with the caller, and allowing the selected agent to modulate the cadence thereof in an effort to more closely match with the cadence associated with the determined geographic location.

14. The method of claim 1 further comprising allowing the selected agent to converse with the caller, the selected agent hopefully speaking with a matched cadence somewhat like the called party, and monitoring the cadence of the selected agent in an effort to ensure that the matched cadence is achieved.

15. The method of claim 1 further comprising allowing the selected agent to converse with the caller, the selected agent hopefully speaking with a matched cadence somewhat like the called party, monitoring the cadence of the selected agent in an effort to ensure that the matched cadence is achieved, detecting that the matched cadence is not achieved, and displaying a corresponding message in a display associated with the selected agent so that the selected agent may if possible attempt to remedy same.

16. A method performed by an answering service when a caller places a call to a called party and the called party is unable or unwilling to answer the call directly, the call being forwarded to the answering service and answered by one of a plurality of agents of the answering service, the method being performed by a computing system of the answering service and comprising:

determining a cadence of the call;

selecting from one of the plurality of agents to answer the call from the caller, the selecting of the selected agent including:

determining a cadence of the selected agent;

matching the determined cadence of the selected agent to the determined cadence of the call; and effectuating contact between the selected agent and the call, the method comprising:

receiving the call on a connection of the computing system of the answering service;

determining a geographic location associated with the caller, the determined geographic location having a predetermined cadence associated therewith, the predetermined cadence associated with the determined geographic location being a speaking style of a voice typically associated with the determined geographic location, based on at least one of voice speed, speech volume, and voice inflection;

selecting one of the plurality of agents as having a cadence that matches the predetermined cadence associated with the determined geographic location, the cadence of the selected agent being a speaking style of a voice of the selected agent, based on at least one of voice speed, speech volume, and voice inflection;

assigning the call to the selected agent; and effectuating contact between the selected agent and the caller, the called party being a funeral professional and the caller calling the funeral professional regarding goods and/or services available therefrom, whereby the matched cadence may be expected to heighten a kinship, bond, and/or emotional connection the caller perceives from the selected agent.

17. The method of claim 16 wherein selecting one of the plurality of agents as having a cadence that matches a cadence associated with the determined geographic location comprises:

pre-identifying that the cadence of the selected agent is suitable for the predetermined cadence associated with the determined geographic location;

pre-storing the pre-identified geographic location in a record for the selected agent in a database; and retrieving from the database the record for the selected agent in a search for agents with a cadence suitable for the determined geographic location.

18. The method of claim 17 wherein pre-identifying that the cadence of the selected agent is suitable for the predetermined cadence associated with the determined geographic location comprises employing a matcher, the matcher continuously monitoring cadence characteristics of the selected agent and based thereon developing a profile for the selected agent in the database, including one or more geographic locations for which the selected agent is suitable.

19. The method of claim 18 further comprising the matcher automatically reassigning the selected agent to different geographic locations over time as the cadence of the selected agent changes.

20. The method of claim 16 further comprising determining the geographic location associated with the caller by pre-selecting from among a plurality of predetermined geographic locations, each predetermined geographic location having a predetermined cadence associated therewith.

* * * * *